Sept. 26, 1950     R. S. BOHANNAN     2,523,413
HYDRAULIC WEIGHING SCALES
Filed Dec. 6, 1945     2 Sheets-Sheet 1
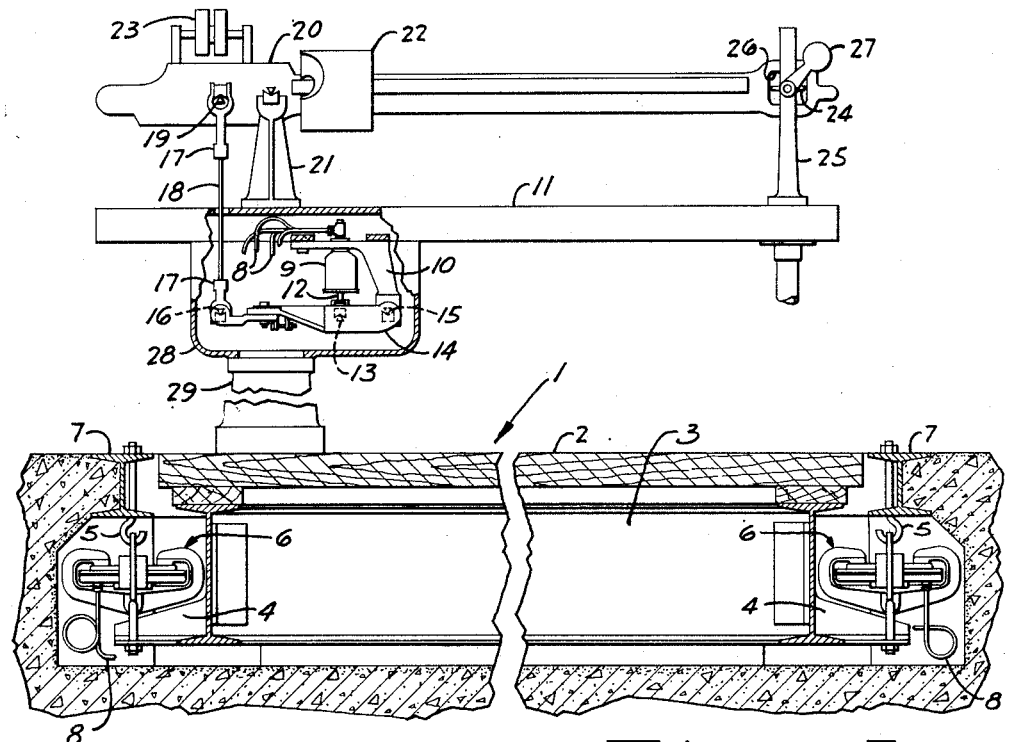
Fig. I
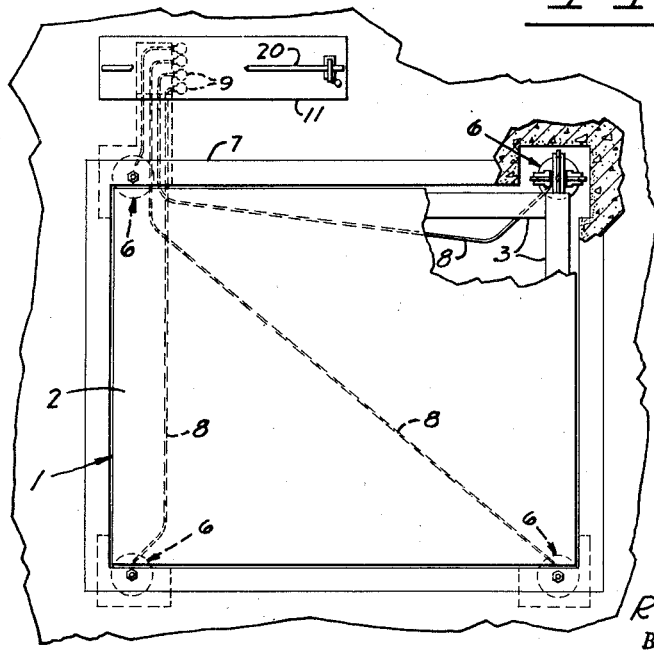
Fig. II
INVENTOR.
Robert S. Bohannan
BY Marshall & Marshall
ATTORNEYS Sept. 26, 1950  R. S. BOHANNAN  2,523,413
HYDRAULIC WEIGHING SCALES
Filed Dec. 6, 1945  2 Sheets-Sheet 2
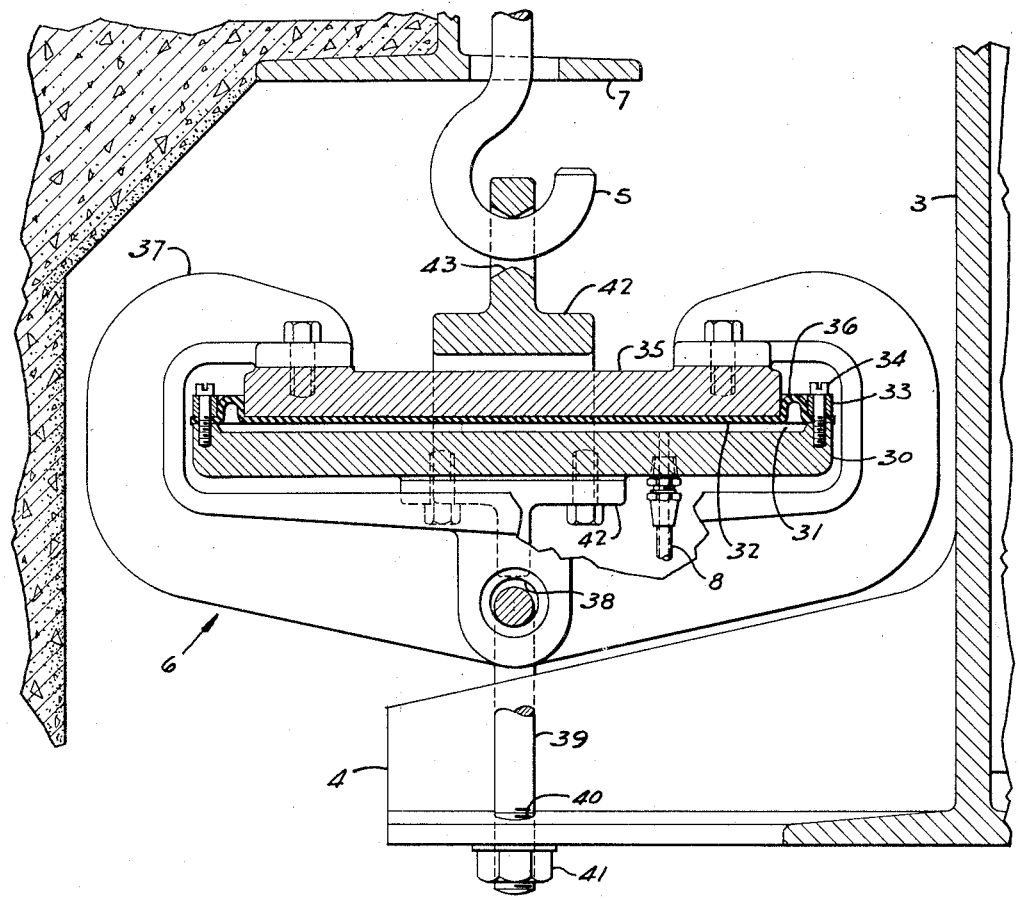
*Fig.* III
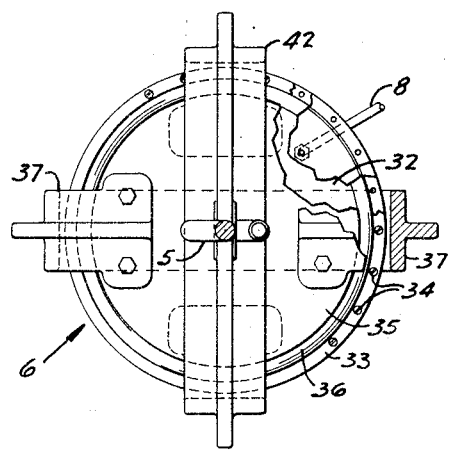
*Fig.* IV
INVENTOR.
Robert S. Bohannan
BY
Marshall & Marshall
ATTORNEYS Patented Sept. 26, 1950

2,523,413

UNITED STATES PATENT OFFICE 2,523,413

HYDRAULIC WEIGHING SCALES

Robert S. Bohannan, Toledo, Ohio, assignor to Toledo Scale Company, Toledo, Ohio, a corporation of New Jersey Application December 6, 1945, Serial No. 633,200

4 Claims. (Cl. 265—47)

This invention relates to weighing scales employing hydraulic force transmitting elements and in particular to an improved mounting for the hydraulic capsules serving as supports for the load receiver.

One of the difficulties encountered in the construction of a precision weighing scale employing hydraulic force transmitting elements is the elimination of the error introduced by tipping of the plates of the hydraulic capsules serving as load supports. When one part of a capsule tips with respect to the other part a small change in effective area occurs. This apparent change in effective area of a capsule has been observed in those capsules in which a flexible membrane is used to confine the hydraulic fluid. When one part of the capsule tips the width of the space sealed by the membrane is slightly increased. The effective area of the capsules before any tipping occurs includes half of the projected area of the membrane. When tipping occurs and the width of the space sealed by the membrane increases half of the increase is taken from the effective area of the capsule because half of the membrane is supported from the fixed plate of the capsule. Thus, the tipping causes an apparent decrease in the effective area of the capsule and for a given load results in slightly higher hydraulic pressure.

The tipping of a capsule may be caused by the bending of the girders supporting the platform of the scale when a concentrated load is placed on the center of the platform or it may be caused by side forces tending to laterally displace the platform.

The principal object of this invention is to provide an improved mounting for a hydraulic capsule such that the capsule elements will not be deranged by either lateral movement of the platform or deflection of the girders of the platform.

Another object of the invention is to provide a mounting for a hydraulic capsule such that eccentric loading of the capsule is prevented.

Another object is to provide a simple structure for supporting a weighing scale load receiver which structure will permit oscillation of the load receiver but will prevent any tipping of the capsule elements with respect to each other.

These and other objects and advantages are attained according to the invention by utilizing a hydraulic capsule as a link of a suspension system serving as a support for the load receiver of a scale. By forming the capsule assembly so that it may be used as a freely swinging link of a suspension system the capsule assembly is subjected only to tensile forces and therefore all tendency for the capsule elements to tip with respect to each other is eliminated.

A specific embodiment illustrating a preferred form of the invention is illustrated in the drawings.

In the drawings:

Figure I is a side elevation, partly in section, of a hydraulic weighing scale in which the load receiver is supported on hydraulic capsules mounted according to the invention.

Figure II is a plan view, partly in section, of the weighing scale shown in Figure I.

Figure III is a side elevation at greatly enlarged scale of one of the hydraulic capsules serving as a support for the load receiver.

Figure IV is a plan view, with parts broken away and parts shown in section, of the hydraulic capsule shown in Figure III.

These specific figures and the accompanying description illustrate a preferred form of the invention and are not intended as limitations on the claims.

A hydraulic weighing scale constructed according to the invention consists of a load receiver 1 having a deck 2 made of wood or other suitable material supported on a rigid steel girder structure 3. At each corner of the load receiver 1 the steel framework 3 is provided with a laterally extending bracket 4 which is suspended from a hook 5 by a capsule assembly 6 serving as a freely swinging link. The hooks 5 are set in overhanging steel copings 7 defining the edge of a concrete lined pit.

Hydraulic pressures generated in the capsule assemblies 6 in response to loads placed on the load receiver 1 are transmitted through pipes 8 to pressure receiving elements 9 mounted on a bracket 10 attached to the lower surface of a weigh beam shelf 11. Bellows mounted within the pressure receivers 9 act against struts 12 to transmit force through the struts 12 to load knife edges 13 of a gathering lever 14. There is a pressure receiver 9 and strut 12 for each of the capsule assemblies 6 located at the corners of the load receiver 1. The gathering lever 14 is fulcrumed on bearings 15 mounted in the lower end of an arm of the bracket 10. The lever 14 is provided with a power pivot 16 which, connected through stirrups 17 and a steelyard rod 18, transmits force to a load knife edge 19 fitted in a weigh beam 20. The weigh beam 20 is fulcrumed on a pedestal 21 erected from the beam shelf 11.

A poise 22 slidably mounted on the weigh beam 20 serves to counterbalance forces applied to the gathering lever 14 by the pressure receivers 9 in response to loads being weighed on the load receiver 1.

The weigh beam 20 is initially balanced by adjustment of a pair of adjusting weights 23 and its travel is limited by a trig loop locking plate 24 mounted in a stand 25 and adapted to engage the upper or lower surfaces of a trig loop 26 formed in the free end of the beam 20. A handle 27 connected to the plate 24 provides for locking the beam by rotating the plate 24 to a vertical position. The plate 24 is horizontal when the beam is in use.

The gathering lever 14 and the pressure receivers 9 are enclosed in a cabinet 28 formed integrally with a pedestal 29 serving as a support for the weigh beam shelf 11.

The capsule assembly is shown in detail in Figure III. The capsule itself consists of a lower plate 30 whose upper surface is relieved to form a chamber 31 adapted to contain hydraulic fluid. The hydraulic fluid is confined by a membrane 32 formed of a sheet of rubber or other flexible material and clamped to the periphery of the plate 30 by a sealing ring 33 held in place by a plurality of screws 34. A diaphragm or upper capsule plate 35 rests on the membrane 32, the membrane being allowed to form a bead 36 in the space between the periphery of the diaphragm 35 and the clamping ring 33. The hydraulic fluid in the chamber 31 serves to support the diaphragm 35 and, by communication through the pipes 8, to transmit any load forces applied to the diaphragm 35 to the pressure receivers 9 which act on the gathering lever 14. Load forces are applied to the diaphragm 35 by a double hook or C-shaped member 37 whose ends are bolted to the diaphragm 35 and which extends around the edge of and below the lower plate 30 of the capsule. The center of the lower part of the C-shaped member 37 is provided with an eye 38 engaged by a U-bolt 39. The ends of the U-bolt pass through holes 40 in the bottom flange of the bracket 4 and are threaded to receive nuts 41 so that the bracket 4 may be supported from the C-shaped member 37. A similar C-shaped member 42 whose ends are bolted to the lower capsule plate 30 extends across the top of the capsule assembly and in its upper center section is provided with an eye 43 adapted to receive the hook 5.

The eyes 38 and 43 are beveled outwardly each way so that substantially point contact is made with the U-bolt 39 and the hook 5.

In this construction since the load and supporting forces are transmitted to the capsule assembly through the substantially point contacts in the eyes 38 and 43 the capsule assembly 6 behaves as though it were a link of a chain connecting the U-bolt 39 to the hook 5. Therefore, only tensile forces between the eyes 38 and 43 may be transmitted through the capsule assembly 6. The lower capsule plate 30 and the diaphragm 35 are rigidly secured to the C shaped members 42 and 37 respectively so that neither of the plates may tip with respect to C shaped members and thereby cause the relative tipping of the capsule plates. The membrane 32 is sufficiently strong in shear so that the diaphragm 35—the upper member of the capsule—cannot slide off sidewise.

This construction provides simple means for insuring that only straight compressive forces free from any tipping or bending are transmitted to the diaphragm of the hydraulic capsule and therefore the hydraulic force transmission ratios of the capsules are not affected by any swinging of the load receiver 1 or any deflection of the desk supporting framework 3.

The preferred structure for employing a hydraulic capsule as a force measuring element in a suspension system is shown in the drawings. The assembly may be varied in various details of either capsule construction or bracket arrangement without losing the benefits obtained by employing the capsule assembly as a tension member subjected to tensile forces only and permitting it to align itself with the line of action of the forces which it is designed to translate into hydraulic pressure.

Having described the invention, I claim:

1. In a weighing scale, in combination, a load receiver, a frame surrounding the load receiver, a plurality of links dependingly attached to the frame, a plurality of links attached to portions of the load receiver that are located beneath the frame links, and a plurality of hydraulic capsules equipped with means for engaging the links to swingably support the load receiver from the frame.

2. In a weighing scale, in combination, a load receiver, a frame surrounding the load receiver with portions of the frame overhanging portions of the load receiver, links depending from the overhanging portions of the frame, other links mounted in the overhung portions of the load receiver, and a plurality of hydraulic capsules suspended from the depending links and connected to the load receiver links, the assemblies comprising the capsules and links serving as the sole support for the load receiver.

3. In a weighing scale, in combination, a load receiver, a frame surrounding the load receiver, support members dependingly attached to the frame, other members on the load receiver that are located beneath the support members, and a plurality of hydraulic capsules equipped with means for engaging the members to swingably support the load receiver from the frame.

4. In a weighing scale, in combination, a load receiver, a frame surrounding the load receiver with portions of the frame overhanging portions of the load receiver, depending supports on the frame, support members mounted in the load receiver, and a plurality of hydraulic capsules suspended from the depending supports and connected to the load receiver members, the support assemblies including the capsules serving as the sole support for the load receiver.

ROBERT S. BOHANNAN.

REFERENCES CITED

The following references are of record in the file of this patent:

UNITED STATES PATENTS

| Number | Name | Date |
| --- | --- | --- |
| 1,001,158 | Nelson | Aug. 22, 1911 |
| 1,023,154 | Kenerson | Apr. 16, 1912 |
| 1,997,864 | Hill | Apr. 16, 1935 |
| 2,279,912 | Bohannan | Apr. 14, 1942 |
| 2,304,363 | Johansen | Dec. 8, 1942 |

FOREIGN PATENTS

| Number | Country | Date |
| --- | --- | --- |
| 13,238 | Great Britain | 1913 |